United States Patent [19]

Suzuki

[11] Patent Number: 4,928,242
[45] Date of Patent: May 22, 1990

[54] VEHICLE SPEED SENSOR ABNORMALITY DETECTION DEVICE

[75] Inventor: Yutaka Suzuki, Kanagawa, Japan

[73] Assignee: Nissan Motor Company, Limited, Japan

[21] Appl. No.: 200,126

[22] Filed: May 26, 1988

[30] Foreign Application Priority Data

May 28, 1987 [JP] Japan .............................. 62-79952[U]

[51] Int. Cl.$^5$ ........................................... G01M 19/00
[52] U.S. Cl. ............................ 364/424.03; 364/424.1; 123/479; 73/118.1
[58] Field of Search ...................... 364/424.03, 424.04, 364/550, 424.1, 551.01, 431.03; 340/52 R, 52 F, 438, 439; 123/479; 73/117.3, 118.1

[56] References Cited

U.S. PATENT DOCUMENTS

| | | | |
|---|---|---|---|
| 4,541,386 | 9/1985 | Kishi et al. | 123/479 |
| 4,615,321 | 10/1986 | Haefner | 340/52 R |
| 4,700,563 | 10/1987 | Iwata et al. | 73/118.1 |
| 4,759,212 | 7/1988 | Sawada et al. | 73/118.1 |
| 4,780,826 | 10/1988 | Nakano et al. | 73/117.3 |

*Primary Examiner*—Gary Chin
*Attorney, Agent, or Firm*—Lowe, Price, LeBlanc, Becker & Shur

[57] ABSTRACT

In order to detect a sensor malfunction, the outputs of two sensors which sense the same operational parameter are both compared with a predetermined value. When the outputs of the sensors fall on either side of the predetermined value the one having the lower value is assumed to be inoperative. The comparison is continually repeated and the operative/inoperative status of the sensors continually updated.

10 Claims, 4 Drawing Sheets

(A) ACTUAL VEHICLE SPEED

TIME (B) FIRST SPEED SENSOR OUTPUT t1  t2  t3  TIME (C) FIRST SPEED SENSOR OUTPUT

TIME (D) SPEED SIGNAL

TIME

VEHICLE SPEED SENSOR ABNORMALITY DETECTION DEVICE

BACKGROUND OF THE INVENTION

1. Field of the Invention

The present invention relates generally to abnormality detection devices and more specifically to an abnormality detection device suited for use with automotive vehicle speed sensors and the like.

2. Description of the Prior Art

In order to control automatic transmissions and similar arrangements in automotive vehicles it is known to sense the vehicle speed and produce an electric signal indicative thereof.

In view of the importance of the signal to the control of the vehicle such systems have been provided with abnormal operation (malfunction) detection circuits for detecting a speed sensor malfunction. One example of such a vehicle speed sensor/abnormality detection circuit is disclosed in TOYOTA CROWN OPERATORS MANUAL published on Aug. 31, 1983 by TOYOTA AUTOMOTIVE Co. Ltd SERVICE SECTION PUBLICATION pages 4-26 to 4-27.

The device disclosed in this publication is such that if the vehicle speed sensor malfunctions during the running of the vehicle, the abnormality detection circuit is able to detect the change. However, if the vehicle speed sensor malfunctions from the outset (viz., prior the vehicle being driven) the malfunction cannot be discovered.

In order to overcome this drawback the entity to which the instant application is assigned, proposed an arrangement (disclosed in JM-A-61-9707) wherein more than two vehicle speed sensors were provided in the vehicle. In this arrangement when one of the sensors produced a signal indicative of a predetermined vehicle speed, irrespective of no signals being produced by the other sensors, the sensor in question was indicated as being out of order.

With this arrangement one of the sensors is primarily used and only when this main sensor is detected as being out of order, is the output of the an auxiliary sensor used. However, as the malfunctioning sensor is still connected to the system, it sometimes occurs that due to vehicle vibration or the like that the primary sensor accidentally produces an output pulse. Under these circumstances, even though this sensor has been designated as being out of order, it is re-evaluated as being functional and the output of the sensor is, even though it does not necessarily accurately represent the vehicle speed, is used for the purposes of transmission shift control and the like.

By way of example, as shown in FIG. 5 at time t1 the primary or first speed sensor becomes inoperative while the output of a second speed sensor remains constant. For a brief period from time t2 to t3, for reasons such as set forth above, an output from the first or primary sensor is produced. This results in the output of the first sensor influencing the actually used speed signal (D) in the manner indicated.

SUMMARY OF THE INVENTION

It is an object of the present invention to provide a malfunction detection circuit which can be used with two or more sensors such as vehicle speed sensors and which can diagnose a malfunction and nominate which of the sensors is out of order, without adverse influence from noise and the like signals that may be accidentally generated due to external influences such as vibration and the like.

In brief, the above object is achieved by a diagnostic arrangement wherein, the outputs of two sensors which sense the same operational parameter are both compared with a predetermined value. When the outputs of the sensors fall on either side of the predetermined value the one having the lower value is assumed to inoperative. The comparison is continually repeated and the operative/inoperative status of the sensors continually updated.

More specifically, a first aspect of the invention comes in the form of a system which features: a first sensor for sensing the magnitude of a first operational parameter; a second sensor for sensing said magnitude of said first operational parameter; a control circuit which receives the outputs of said first and second sensors and which produces a control signal, said control circuit including means for diagnosing the normality of said first and second sensors, said diagnosing means including circuitry for: comparing the output of said first sensor with a predetermined value; comparing the output of said second sensor with said predetermined value; indicating that said second sensor is malfunctioning in the event that the output of said first sensor is above said predetermined value and the output of said second sensor is below said predetermined value; and indicating that said first sensor is malfunctioning in the event that the output of said first sensor is below said predetermined value and the output of said second sensor is above said predetermined value.

A second aspect of the present invention comes in the form of a control method which features the steps of: using a first sensor for sensing the magnitude of a first operational parameter; using a second sensor for sensing said magnitude of said first operational parameter; diagnosing the normality of said first and second sensors by: comparing the output of said first sensor with a predetermined value; comparing the output of said second sensor with said predetermined value; indicating that said second sensor is malfunctioning in the event that the output of said first sensor is above said predetermined value and the output of said second sensor is below said predetermined value; and indicating that said first sensor is malfunctioning in the event that the output of said first sensor is below said predetermined value and the output of said second sensor is above said predetermined value.

A further aspect of the present invention comes in that the above mentioned method further features the steps of: using a third sensor for sensing the magnitude of a second operational parameter; using the output of said third sensor in combination with one of the outputs of said first and second sensors to develop said control signal; preferentially using the output of said first sensor for developing said control signal; and utilizing the output of said second sensor only when said diagnosing means indicates the said first sensor is malfunctioning.

DETAILED DESCRIPTION OF THE PREFERRED EMBODIMENTS

Figure 1:
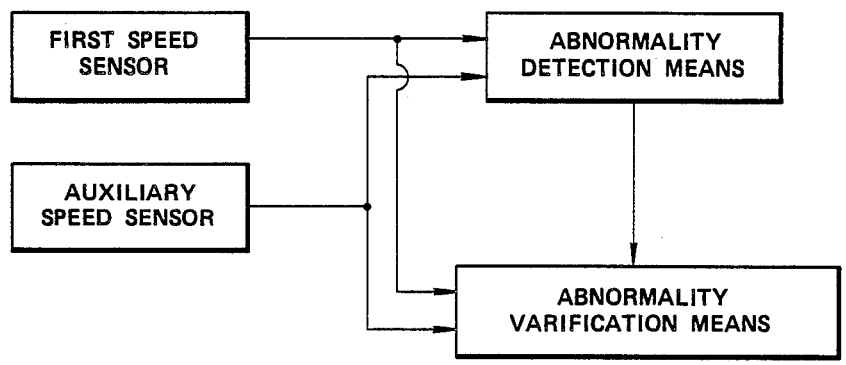
FIG. 1 is a functional block diagram showing the arrangement which characterizes the present invention.
Figure 2:
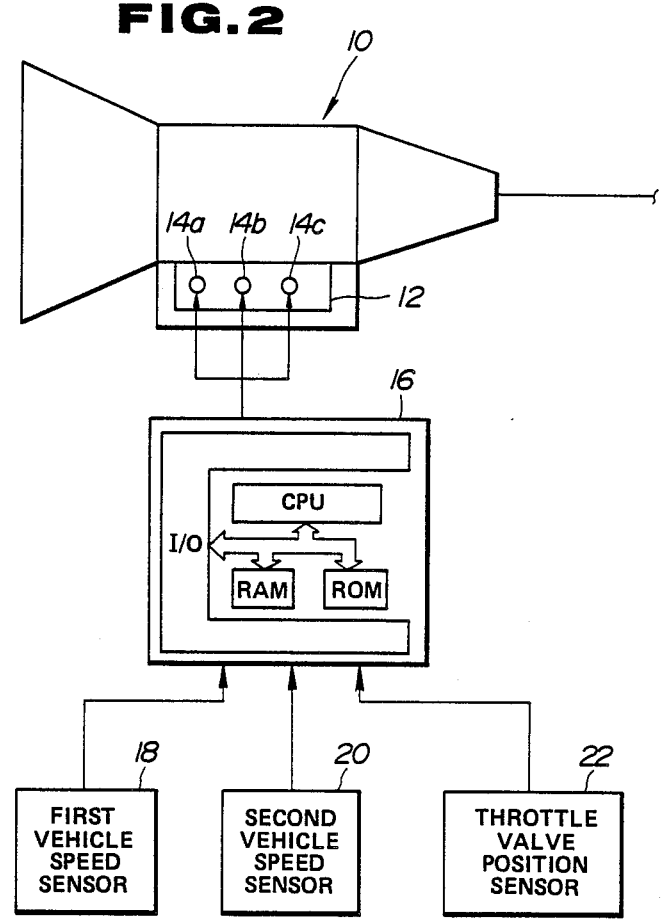
FIG. 2 is a schematic diagram showing a transmission system to which an embodiment of the present invention is applied.

FIG. 2 shows an embodiment of the present invention. In this arrangement a four forward and one reverse speed automatic transmission 10 is provided with a control valve arrangement 12 which includes a plurality of spool valves which are arranged to selectively engage one or more of a plurality of friction elements which form part of the transmission. In this instance the operation of the spool valves is, in part, controlled by solenoids 14a, 14b and 14c. As shown a control signal is applied to the solenoids 14a–14c from a control circuit 16. The control circuit is operatively connected with first and second vehicle speed sensors 18 and 20. These sensors are arranged to produce signals indicative of the vehicle speed.

The control circuit is further connected with a throttle valve position sensor 22. The output of this sensor is indicative of the load on the engine.

It should be noted that the first and second vehicle speed sensors 18, 20 are arranged so that while the first vehicle speed sensor 18 is functioning correctly, the signal produced by the second vehicle speed sensor 20 is not used in connection with the various operations which are performed in the control circuit 16. Thus, while the first vehicle speed sensor is operating normally, the output produced by the same and the engine load signal are used to control the shifting of the transmission.

As shown, the control circuit 16 in this instance is arranged to include a microprocessor which includes as basic elements thereof, a RAM, ROM, CPU and I/O interface. The ROM contains a number of control programs and the like including a sensor diagnostic program which will be discussed in detail hereinafter.

Figure 3:
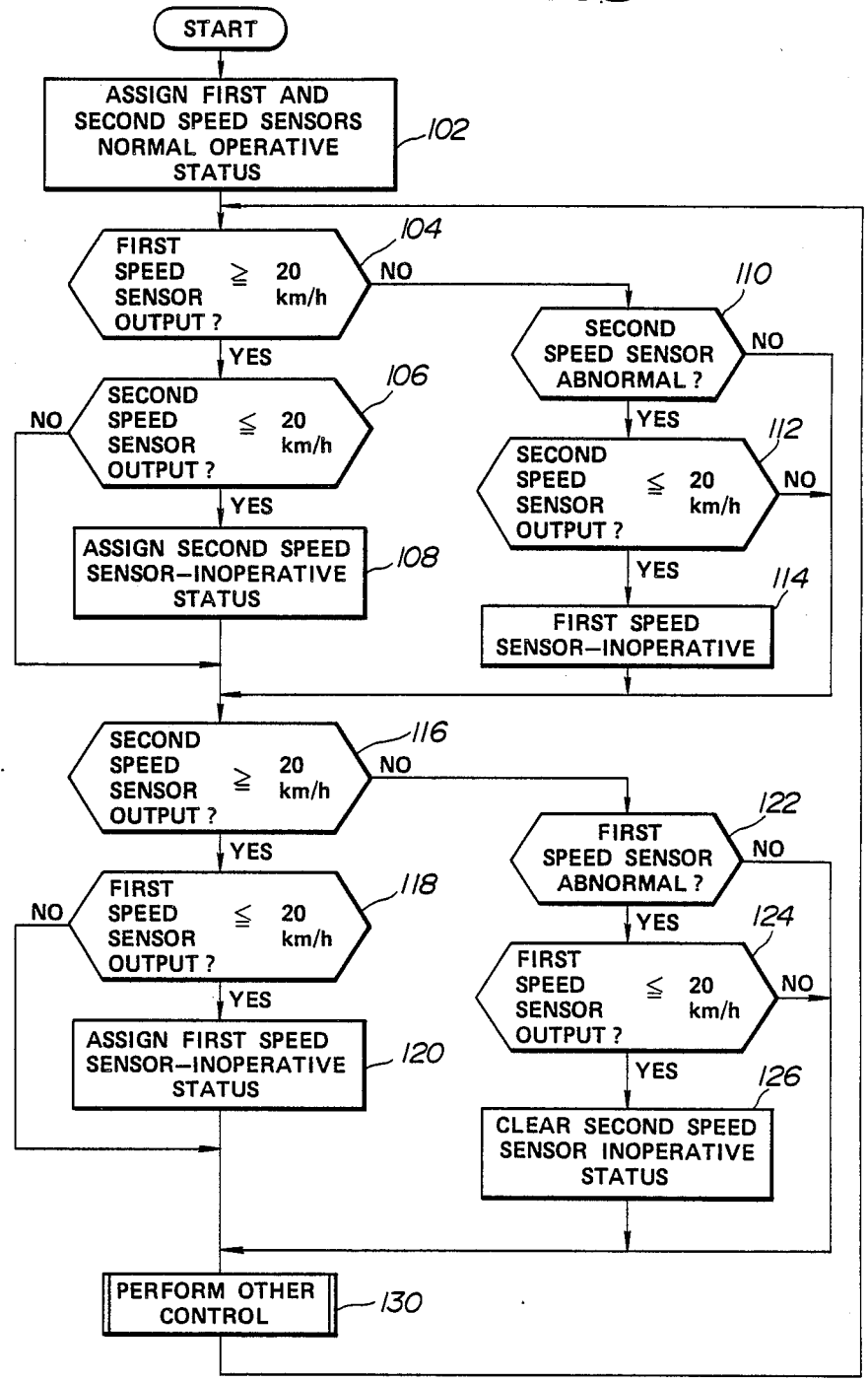
FIG. 3 is a flow chart showing the steps which characterize the diagnostic operation of the instant invention.

FIG. 3 shows in flow chart form the operations which characterize the above mentioned diagnostic program. The routine depicted in this figure is such as to be run from the time that the engine ignition switch is closed. In the first step (102) of this routine flags or similar indicators are set in a manner to indicate the normality of both of the first and second vehicle speed sensors 18, 20. Following this, the output of the first vehicle speed sensor 18 is sampled and compared with a predetermined speed which in this instance is selected to be 20 km/h (merely by way of example). In the event that the output of the sensor indicates a speed which is equal to or greater than the predetermined limit, the output of the second vehicle speed sensor 20 is sampled in step 106 and compared with the same value. If the outcome of this step is such as to indicate that the second vehicle speed sensor 20 is less than or equal to 20 km/h the program flows on to step 116. However, in the event that the second vehicle speed sensor 20 indicates a speed greater than 20 km/h then at step 108 an indicator (flag or the like) is set indicating that the second sensor 20 is inoperative is set.

On the other hand, if the outcome of step 104 is such as to indicate that the first vehicle speed sensor 18 is currently producing a signal indicative of a speed less than 20 km/h then the program flows to step 110 wherein it is checked to determine if the second vehicle speed sensor 20 is functioning properly or not. This determination can be executed by checking the setting of a flag or like indicator such as set in step 108.

In the case that the outcome of step 110 is positive then the program flows on to step 112 wherein the output of the second vehicle speed sensor 20 is sampled and compared with a value of 20 km/h. In the event that the instant output of the second vehicle speed sensor 20 is greater than 20 km/h then the program by-passes step 114 and flows to step 116. On the other hand, if the outcome of step 112 is such to indicate a value which is equal to or less than 20 km/h then at step 114 the indication (e.g. flag) indicating that the first vehicle speed sensor 18 is inoperative is cleared and the program goes on to step 116.

In step 116 the output of the second vehicle speed sensor 20 is again compared with a value of 20 km/h. If the value is greater or equal to the predetermined value then the program goes to step 118 wherein the output of the first vehicle speed sensor 18 is compared with the predetermined speed limit of 20 km/h.

In the event that the first vehicle speed sensor 18 is found to be indicating a speed which is greater than the above mentioned limit the program by-passes step 130 and goes on to step 120 wherein other controls and routines are run. However, if the output of the first vehicle speed sensor 18 is equal to or less than the limit, then at step 120 an indicator of flag is set to indicate that the first vehicle speed sensor 18 is inoperative.

On the other hand, if the value of the output of the second vehicle speed sensor 20 is found to be less than 20 km/h at step 116 then at step 122 the status (normal/abnormal) of the first vehicle speed sensor 18 is checked. In the case of an abnormality being indicated then at step 124 the output of the first vehicle speed sensor 18 is compared with 20 km/h. If the output is greater than the limit then step 126 is by-passed and the program goes to step 130. However, in the event that said output is less than or equal to 20 km/h then at step 126 the indicator indicating that the second vehicle speed sensor 20 is inoperative is cleared.

With the above routine if the outputs of the first and second vehicle speed sensors 18, 20 are both below 20 km/h then the program flows through steps 104 - 110 - 112 - 114 - 116 - 122 - 124 - 126 - 130 - 104 indicating that there is no malfunction or abnormality in either sensor. Accordingly, the output of the first vehicle speed sensor 18 is used as the data input upon which control calculations and the like are based.

In the event that the outputs of the sensors 18, 20 are both above 20 km/h program flows through steps 104 - 106 - 116 - 118 - 130 - 104. This similarly indicates that the there are no abnormalities and the signal from the first vehicle speed sensor 18 is used in the normal manner.

On the other hand, if the output of the first vehicle speed sensor 18 is above the preselected limit of 20 km/h and the output of second one is lower than the same, then the program flows through steps 104 - 106 - 108 indicating that the second vehicle speed sensor is inoperative and subsequently inducing the program to continue through steps 116 - 122 - 124 - 130 - 104 which permits the output of the first vehicle speed sensor to be used for control purposes.

Conversely, if the output of the first vehicle speed sensor 18 is lower than 20 km/h while the output of the second vehicle speed sensor 20 is higher than the same, then program flows through steps 104 - 110 - 112 - 116 - 118 - 120 - 130 - 104 designating the first vehicle speed sensor 18 as inoperative and permitting output of the second vehicle speed sensor to be used for control purposes.

In addition to the above, if the both of the vehicle speed sensor become inoperative then both simultaneously fail to generate outputs. As upshifting of the transmission will not occur due the apparent zero vehicle speed, the double malfunction becomes self-evident and permits such a situation to be readily analyzed.

Figure 4:
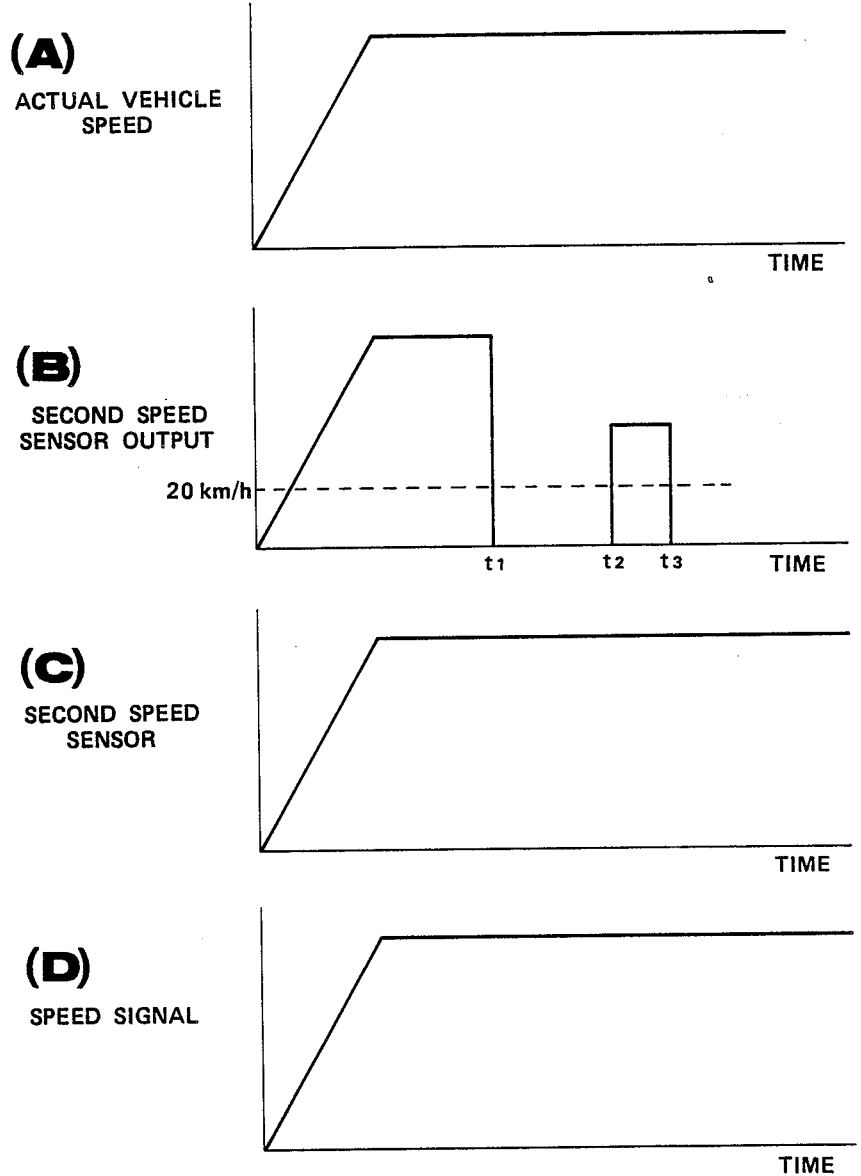
FIG. 4 is a timing chart showing the operational characteristics of the present invention.
Figure 5:
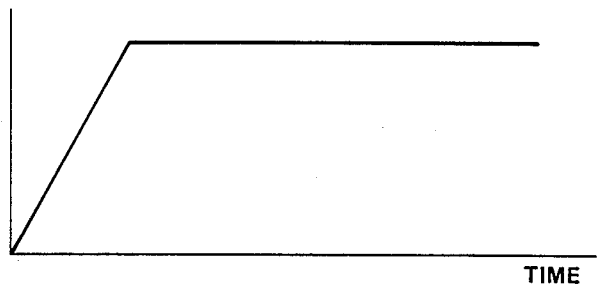
FIG. 5 is a timing chart similar to that shown in FIG. 4 but which demonstrates the drawback encountered with the second of the prior art arrangements discussed in the opening paragraphs of the instant disclosure.
Figure 5:
Figure 5:
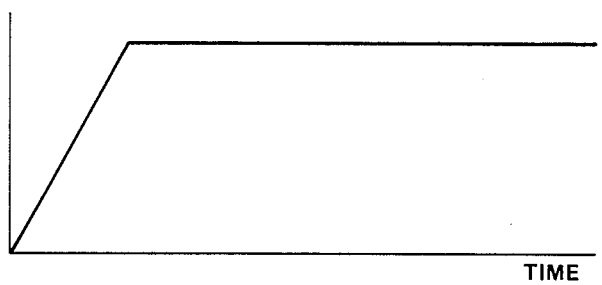
Figure 5:
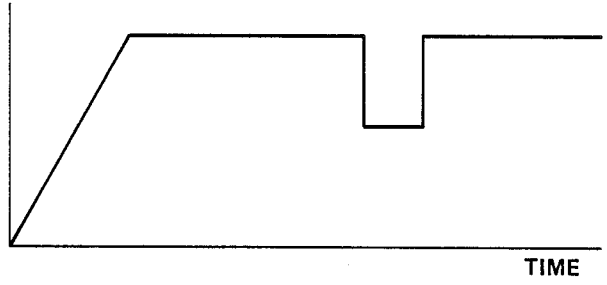

By way of example let it be assumed that, as shown in the timing chart of FIG. 4, the first vehicle speed sensor 18 malfunctions and becomes inoperative at a time t1, and that due to external influences such as vibration which is transmitted through the vehicle chassis and the like, a brief output appears on input port of the microprocessor associated with the first sensor, between times t2 and t3. This brief output, while having a value greater than 20 km/h is lower than the value generated during normal malfunction free operation. In this case, until time t1 the present invention utilizes the output of the first vehicle speed sensor 18 for control purposes, however immediately after time t1 and following the disappearance of the output of the first vehicle speed sensor 18, the output of the second vehicle speed sensor is used in place of the first one. During the period t2 to t3 the output of the second vehicle speed sensor 20 continues to be used for transmission control and the like and the problem depicted in FIG. 5(D) is obviated.

That is to say, with the present invention, as the differences between the sensor outputs and a predetermined value (in this case 20 km/h) are compared, whenever the two values fall on either side of the limit it is possible to assuredly detect a malfunction and nominate which of the sensors has become abnormal despite intermittent pulses being accidentally generated.

What is claimed is:

1. In a system
a first sensor for sensing the magnitude of a first operational parameter;
a second sensor for sensing said magnitude of said first operational parameter;
a control circuit which receives the outputs of said first and second sensors and which produces a control signal, said control circuit including means for diagnosing the normality of said first and second sensors, said diagnosing means including circuitry for:
comparing the output of said first sensor with a predetermined value;
comparing the output of said second sensor with said predetermined value;
indicating that said second sensor is malfunctioning in the event that the output of said first sensor is above said predetermined value and the output of said second sensor is below said predetermined value; and
indicating that said first sensor is malfunctioning in the event that the output of said first sensor is below said predetermined value and the output of said second sensor is above said predetermined value.

2. A system as claimed in claim 1, wherein said circuitry of said diagnosing means, when indicating that said second sensor is malfunctioning, is further operable for ignoring the output of said second sensor until a difference between said first and second signal is decreased to be smaller than or equal to a set value; and, when indicating that said first sensor is malfunctioning, is further operable for ignoring the output of said first sensor until a difference between said first and second signal is decreased to be smaller than or equal to a set value.

3. A system as claimed in claim 1 wherein said diagnosing means is operative for continually repeating said steps of comparing the outputs of said first and second sensors with said predetermined value to provide continual updates of indications that either of said first and second sensors is operative and/or inoperative.

4. In a system
a first sensor for sensing the magnitude of a first operational parameter;
a second sensor for sensing said magnitude of said first operational parameter;
a third sensor, said third sensor sensing the magnitude of a second operational parameter;
a control circuit which receives the outputs of said first and second sensors and which produces a control signal, said control circuit including means for diagnosing the normality of said first and second sensors, said diagnosing means including circuitry for:
comparing the output of said first sensor with a predetermined value;
comparing the output of said second sensor with said predetermined value;
indicating that said second sensor is malfunctioning in the event that the output of said first sensor is above said predetermined value and the output of second sensor is below said predetermined value; and
using the output of said third sensor in combination with one of the outputs of said first and second sensors to develop said control signal, said control circuit preferentially using the output of said first sensor for developing said control signal and utilizing the output of said second sensor only when said diagnosing means indicates the said first sensor is malfunctioning.

5. A system as claimed in claim 4 wherein said first and second sensors are vehicle speed sensors, wherein said third sensor is an engine load sensor, and wherein said control signal is applied to a transmission for the purposes of controlling the shifting between gear ratios.

6. A system as claimed in claim 5 wherein said transmission includes a plurality of solenoids, said solenoids being arranged to control the operation of transmission, said solenoids being controlled by said control signal.

7. In a control method the steps of:
using a first sensor for sensing the magnitude of a first operational parameter;
using a second sensor for sensing said magnitude of said first operational parameter;
diagnosing the normality of said first and second sensors by:
comparing the output of said first sensor with a predetermined value;
comparing the output of said second sensor with said predetermined value;

indicating that said second sensor is malfunctioning in the event that the output of said first sensor is above said predetermined value and the output of said second sensor is below said predetermined value; and indicating that said first sensor is malfunctioning in the event that the output of said first sensor is below said predetermined value and the output of said second sensor is above said predetermined value.

8. A method as claimed in claim 7, comprising the further steps of, when indicating that said second sensor is malfunctioning, ignoring the output of said second sensor until a difference between said first and second signal is decreased to be smaller than or equal to a set value; and, when indicating that said first sensor is malfunctioning, ignoring the output of said first sensor until a difference between said first and second signal is decreased to be smaller than or equal to a set value.

9. In a control method the steps of:

using a first sensor for sensing the magnitude of a first operational parameter;

using a second sensor for sensing said magnitude of said first operational parameter;

diagnosing the normality of said first and second sensors by:

comparing the output of said first sensor with a predetermined value;

comparing the output of said second sensor with said predetermined value;

indicating that said second sensor is malfunctioning in the event that the output of said first sensor is above said predetermined value and the output of said second sensor is below said predetermined value;

indicating that said first sensor is malfunctioning in the event that the output of said first sensor is below said predetermined value and the output of said second sensor is above said predetermined value;

using a third sensor for sensing the magnitude of a second operational parameter;

using the output of said third sensor in combination with one of the outputs of said first and second sensors to develop said control signal;

preferentially using the output of said first sensor for developing said control signal; and utilizing the output of said second sensor only when said diagnosing step indicates the said first sensor is malfunctioning.

10. In a system first sensor, serving as a primary sensor, for sensing the magnitude of a first operational parameter and producing an output which is normally used as an output signal;

a second sensor, for serving as a secondary sensor, for sensing said magnitude of said first operational parameter and producing an output;

a control circuit which receives the outputs of said first and second sensors and which produces a control signal, said control circuit including means for diagnosing the normality of said first and second sensors, said diagnosing means including circuitry for:

comparing the output of said first sensor with a predetermined value;

comparing the output of said second sensor with said predetermined value;

indicating that said first sensor is malfunctioning in the event that the output of said first sensor is below said predetermined value and the output of said second sensor is above said predetermined value;

utilizing the output of said second sensor in place of the output of said first sensor as said output signal; and maintaining said second sensor output as said output signal until a difference between the outputs of said first and second sensors becomes smaller than a preset value.

* * * * *